Oct. 29, 1929.   J. R. KING   1,733,377
WINDSHIELD CONTROL DEVICE
Filed April 25, 1928
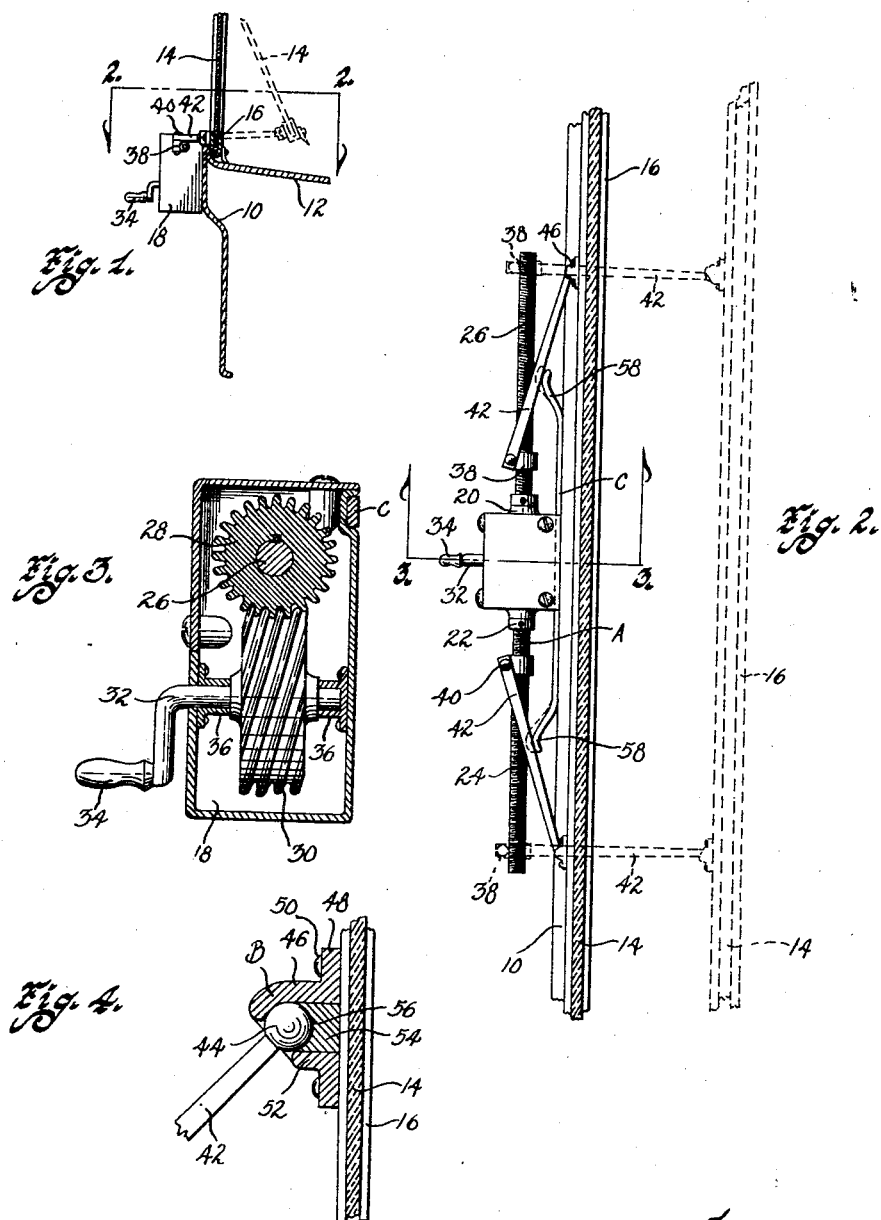

Patented Oct. 29, 1929

1,733,377

UNITED STATES PATENT OFFICE

JOHN R. KING, OF RUTHVEN, IOWA

WINDSHIELD-CONTROL DEVICE

Application filed April 25, 1928. Serial No. 272,675.

The object of my invention is to provide a windshield control device of simple, durable and inexpensive construction.

A further object of my invention is to provide a controlling device for windshields in which means is provided for opening the windshield and keeping it properly aligned without twisting during the opening movement thereof.

Still a further object is to provide means for tightly closing the windshield when the windshield is moved to closed position.

More particularly, it is my object to provide a control device actuated by a manually operated crank which rotates a rod, the rod being threaded and arranged parallel to the windshield with arms coacting with the rod for moving longitudinally thereon when the rod is rotated, the arms being connected to the windshield for opening it during their travel on the rod.

With these and other objects in view my invention consists in the construction, arrangement and combination of the various parts of my device, whereby the objects contemplated are attained, as hereinafter more fully set forth, pointed out in my claims and illustrated in the accompanying drawings.

Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Fig. 1 is a side elevation of my device illustrating it secured to the dash of an automobile for controlling the windshield, the dash and windshield being shown in cross-section.

Fig. 2 is an enlarged plan view thereof, showing the windshield in section as taken on line 2—2 of Fig. 1.

Fig. 3 is an enlarged sectional view on the line 3—3 of Fig. 2 to illustrate a gearing connection between the operating crank and the windshield control device; and Fig. 4 is a sectional view through a connecting member secured to the windshield frame and to which one of the control arms is universally connected.

On the accompanying drawings, I have used the reference numeral 10 to indicate the dash of an automobile. From the dash the body of the automobile extends forwardly, as indicated at 12, to the hood of the automobile. I have illustrated a windshield 14, which is set in a windshield frame 16, the frame itself being hingedly connected to the automobile at its upper end, whereby it may be opened by swinging the lower end forwardly to the dotted line position shown in Figs. 1 and 2.

My improved windshield control device consists of a casing 18 which may be secured to the dash 10 or built into it when the automobile is being made. Rotatably mounted through the casing 18 is a shaft A extending through bearings 20 formed on the casing. Collars 22 may be provided for preventing end play of the shaft A relative to the casing 18. The opposite ends of the shaft A as indicated at 24 and 26 are oppositely screw threaded for a purpose hereinafter to be fully disclosed.

For rotating the shaft A, I provide within the casing 18, a spiral gear 28 secured to the shaft A. A spiral gear 30 coacts with the gear 28 and is mounted on a crank shaft 32 terminating in a crank handle portion 34. The shaft 32 is suitably supported in bearings 36 mounted in the casing 18.

On each of the threaded portions 24 and 26 fittings 38 are mounted and these fittings are internally screw threaded to coact with the screw threads 24 and 26. It may here be noted that the threads 24 are right hand threads and the threads 36 run in an opposite direction. Pivoted to the fittings 38 by means of pins 40 are control arms 42. The free ends of the arms 42 terminate in ball-shaped ends 44.

Each of the balls 44 is mounted in a socket member B secured to the frame 16 of the windshield or where the lower end of the windshield does not have a frame, these sockets may be attached to the glass of the windshield by drilling holes through the shield itself. Each of the sockets B consists of a body portion 46 having flanges 48 through which screws or bolts 50 extend into the windshield frame or the windshield as the case may be. An opening 52 is formed in each socket B through which the arm 42 may be inserted when the device is assembled. This opening is then plugged with a member 54 having a seat 56 and this member is held in position by the screws 40.

Suitably secured to the casing 18 or to the dash 10 is a spring member C having rearwardly curved portions 58 which coact with the arms 42 when the windshield is in closed position, as clearly illustrated in Fig. 2 of the drawings.

*Practical operation*

In the operation of my device the parts normally assume the position illustrated in Figs. 1 and 2. In this position the fittings 38 are drawn inwardly for holding the windshield in closed position and the end portions 58 of the spring C have been sprung from their dotted line position shown, whereby they exert spring tension against the arms 42 which acts on the arms in conjunction with the pins 40 as pivot members for forcing the outer ends of the arms inwardly and thereby holding the windshield in tightly closed position. When it is desired to partially or fully open the windshield, it is merely necessary to rotate the crank shaft 32, whereby the fittings 38 move outwardly and finally assume the dotted line positions shown in Figs. 1 and 2, whereby the windshield is fully opened.

Due to the worm and gear construction of the gears 28 and 30 and to the threaded connection between the rod A and the arms 42, the windshield will be held in any of its adjusted positions without a locking device of any kind. In the type of windshield which slides up and down, my device can be installed either above the windshield or below it and the arms 42 connected to the edges thereof for sliding the windshield. By the particular arrangement wherein two arms are provided, any binding at the side edges of a sliding windshield may be entirely eliminated and in the case of a swinging windshield there is no tendency to twist the glass.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A windshield control device comprising a support, a rod thereon arranged parallel to the windshield, an arm having one end slidably mounted on said rod and its other end pivoted to said windshield whereby the arm when assuming a position substantially parallel to said rod will hold the windshield closed and when assuming a position at right angles to said rod will hold the windshield at its limit of opening movement, and means to resiliently engage said arm when the windshield is in closed position, said means causing one end of the arm to pivot on its connection with the rod, whereby the other end of the arm is constrained to draw the windshield to a tightly closed position.

2. In a device of the character disclosed, a support, an arm having one end associated with said support and its other end connected with said windshield, whereby movement of the arm relative to the support swings the windshield, and means to resiliently engage said arm intermediate the ends thereof and at a predetermined position of adjustment of the arm for causing the end of the arm connected with the windshield to constrain the windshield toward closed position.

JOHN R. KING.